United States Patent [19]

Helava et al.

[11] 3,901,595

[45] Aug. 26, 1975

[54] PARALLEL LINE SCANNING SYSTEM FOR STEREOMAPPING

[75] Inventors: Uuno V. Helava, Southfield; Arliss E. Whiteside, Royal Oak; Gerald A. Brummn, Farmington, all of Mich.

[73] Assignee: The Bendix Corporation, Southfield, Mich.

[22] Filed: Feb. 13, 1974

[21] Appl. No.: 442,024

[52] U.S. Cl. .................................... 356/2; 250/558

[51] Int. Cl.² ........................................ G01C 11/12

[58] Field of Search ........................ 356/2; 250/558

[56] References Cited

UNITED STATES PATENTS

| | | | |
|---|---|---|---|
| 3,548,210 | 12/1970 | Chapelle et al. | 250/558 X |
| 3,726,591 | 4/1973 | Helava et al. | 356/2 |
| 3,783,294 | 1/1974 | Koper | 356/2 X |

*Primary Examiner*—Ronald L. Wibert
*Assistant Examiner*—F. L. Evans
*Attorney, Agent, or Firm*—James R. Ignatowski

[57] ABSTRACT

A system for use in conjunction with a stereomapper for determining conjugate points on stereoscopically generated images along a plurality of parallel lines during each mechanical translation of the images across the area being mapped. The system operates in the digital domain and incorporates control logic, either hardware or software, for modifying the data to correct the geometrical distortions, for selecting the data to be correlated in accordance with the parallax data computed from the preceding correlation, for correlating the selected data, and for generating parallax data. The conversion of the image data to digital form and its attendant storage capabilities permits the data generation to proceed independent of the generation of parallax data. The use of the special purpose minicomputers for data shaping, correlation, and the computation of parallax data permits the data generated by scanning the many parallel lines to be converted to parallax data without exceeding the computation capacity of existing electronics. Further, the scanning of a plurality of parallel lines during each translation of the images reduces the number of translations required to scan the desired area on each image and significantly increases the speed at which the area may be mapped.

33 Claims, 6 Drawing Figures

PARALLEL LINE SCANNING SYSTEM FOR STEREOMAPPING

BACKGROUND OF THE INVENTION

1. Field of the Invention

Stereophotogrammetry — The art of obtaining accurate three-dimensional measurements of a scene using two-dimensional images of that scene.

2. Brief Description of the Prior Art

Automatic stereomappers that match conjugate image details as they appear on two stereo images of a scene are known. One class of known automatic stereomappers as disclosed in U.S. Pat. No. 3,548,210, "Automatic Stereoplotter" by W. E. Chapelle et al, includes apparatus for scanning small spots of light across two stereo images. The light spots are modulated in accordance with the image detail on the stereo images. The correlation between the intensity of light modulated by the different points of light on the two stereo images is measured to identify conjugate image points. Conjugate image points are defined as identical image points on two different stereo images. A maximum of correlation identifies conjugate points. The relative positions of the conjugate points on the two stereo images are then used to calculate the true position as well as the elevation of the conjugate image points in the actual scene, as is well known in the art of stereophotogrammetry.

Corresponding objects or image details on the two stereo images have somewhat different shapes because each stereo image illustrates the scene from a different vantage point. Other factors, such as differential film shrinkage, distortions in the optics, the curvature of the earth's surface, etc., also cause corresponding image details to have different shapes on the different stereo images.

Known automatic stereomappers that provide accurate output measurements such as that disclosed by Chapelle et al include scan shaping apparatus for controlling the motion of the light spots being scanned across the two stereo images. The scan shaping apparatus causes the light spot on one stereo image to follow a somewhat different path from that followed by the spot on the other, so that each spot is moved along corresponding imagery. One of the problems in the art has been to determine the scan paths across each image in order to scan conjugate imagery. One solution has been scan shaping determined by measuring the parallax over different areas around the various points of interest and using the parallax measurements to reshape the scanning motion of the light spots. Parallax is the relative displacement of an image point on the stereo image and is indicative of the height of the image from a predetermined reference plane. An alternate method, disclosed in U.S. Pat. No. 3,726,591 "Stereoplotting Apparatus for Correlating Image Points Disposed Along Epipolar Lines" by U. V. Helava et al, has somewhat simplified the scan shaping procedure and permits the scanning to proceed at a much faster rate. The later methods operate by measuring the imagery along epipolar lines and sampling the image data at determinable intervals to accomplish the desired scan shaping.

In order to operate with the necessary accuracy over the area of stereo images, the systems use servo driven carriages to mechanically move or translate the images with respect to the scanners to follow the line. In addition, some systems also electronically deflect the entire scan pattern with respect to the images to rapidly handling small displacements of the conjugate image points on the individual images. However, the speed of existing stereomappers are primarily limited by the dynamic response of the servos and mechanical elements which determine the rate at which the line may be accurately followed and measured. Recent attempts to increase the speed of the mechanical elements and therefore the speed at which the data is derived from the stereo images have been unsuccessful.

SUMMARY OF THE INVENTION

The subject invention is a method and apparatus for increasing the rate at which conjugate image points are measured and parallax data generated by sequentially scanning about a plurality of parallel lines or points in turn while the associated servos and mechanical elements mechanically move the images with respect to the scanner. The sequential measurement of the several parallel lines of points permits the data collection to proceed at many times the rate of motion of the mechanical elements increasing the overall speed of the system.

The measurement of the several parallel lines may be accomplished by using a single line scan which crosses several parallel lines and the data associated with each of the several lines obtained by gating the scanner or electronically separating the data elsewhere in the system. Alternatively, the scan pattern may be brought to rest upon each of the several lines in a sequential order while the surrounding area is scanned.

The scan pattern or the analog output data generated by the scanning of the several lines on each image is shaped to compensate for differences in the two images due to the factors discussed above. Converting the analog data to digital data permits the data to be temporarily stored and permits data correlation to proceed independent of the scan. Corresponding sets of stored data may then be serially extracted and on line correlation performed while new data is being generated. Parallax data is computed from the correlation data and output to the data storage in the stereomapper control logic for subsequent data manipulation such as plotting elevations along a predeterminable grid or contour line. Geometric and parallax address modification are performed on line to simplify storage and correlation computation. The advantages of the inventive system is the generation of parallax data for more than one line during each translation by the mechanical elements thereby resulting in a substantial increase in the rate at which desired conjugate points are determined and parallax computed without increasing the speed of the mechanical elements and associated servos. Further advantages are a reduction in cost, and a substantial reduction in the capability requirements of the stereomapper control computer through the use of special purpose minicomputers to perform scan and data shaping through address modification and the correlation computations to determine conjugate points on the two images.

DETAILED DESCRIPTION OF THE INVENTION

Figure 1B:
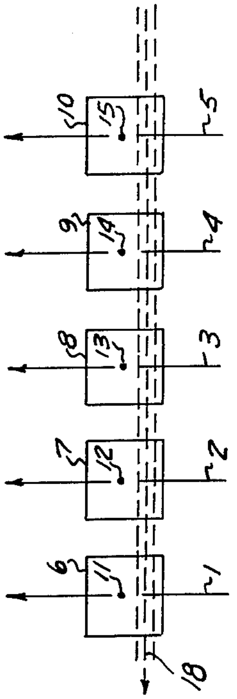
FIG. 1B is an illustration of line scanning across a plurality of parallel lines.
Figure 1A:
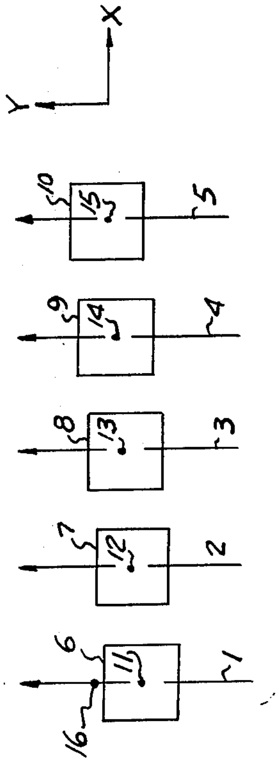
FIG. 1A is an illustration of area scanning about discrete points on a plurality of parallel lines.

FIGS. 1A and 1B show typical parallel line scanning methods that may be used in conjunction with the invention. FIG. 1A illustrates the scanning method where the scan is sequentially directed to each of the several lines, indicated as lines 1–5. At each line, the point of light is caused to scan in a predetermined manner areas 6–10 encompassing points 11–15 respectively. The scanning of the individual areas 6–10 may be accomplished by any conventional method such as electronically deflecting the electron beam of a cathode ray tube generating a point of light at the phosphor screen or deflecting a narrow light beam by any of the known electro-optical, mechanical, electro-mechanical, acoustical, or any other known method in the art. The narrow light beam may be generated by any suitable light source, including a laser. In the illustration FIG. 1A, the scanning within each area 6–10 is generally in the X and Y directions, as indicated by the coordinate system shown to the right of the scan patterns, however, as is well known in the art, the scanning may be accomplished by deflecting the light spot in any other suitable direction which would cause the spot to cover the desired area. The motion produced by the servo driven carriages is generally in the Y direction, parallel to the several parallel lines being scanned. However, this motion on the individual images may be angularly disposed to each other as a result of steering by the servo system to correct for geometrical distortions and to keep the subsequent conjugate points within the scan patterns while the carriage traverses the desired areas on the stereo images. The art of steering in stereomappers to compensate for image distortions and variations in terrain elevation is well known and does not need to be explained in detail for an understanding of the invention.

Because the scan rate of the point of light is orders of magnitude faster than the motion produced in the servo drives, many more than the five lines and associated areas illustrated may be scanned before the scanner needs to be returned to the first line for scanning about the next sequential point, point 16, along the first line. Although point 16 is illustrated as being outside the area 6 scanned for the measurement about point 1, point 16 may be within the area previously scanned. The separation between adjacent points scanned along any given line being measured is determined by the scan rate, number of lines being scanned in parallel, and the motion rate of the servo driven carriage.

FIG. 1B illustrates a method of scanning several lines by a single line scan pattern which crosses the several lines and the separate measurement of each line is obtained by gating the scanner or separating the data about each line elsewhere in the system. The several lines are again illustrated as lines 1–5 containing points 11–15 as discussed with reference to FIG. 1A. Instead of scanning each individual area separately and in a sequential order as discussed with reference to FIG. 1A, the scan line is directed to cross each of the several parallel lines being measured once for each scan. One approach would be a series of parallel scans across the several lines as illustrated by dashed lines 17 which run generally normal to the motion produced by the servo drive carriages from left to right or vice versa. For practical reasons it may be desirable to use bidirectional scanning where the adjacent lines are scanned in opposite directions, as illustrated by scan line 18. Bidirectional scanning eliminates the wasted motion of returning the light beam to its original starting location before scanning the next line. The enclosed areas 6–10 define typical subsegments of each line scan which may be used for correlation of the imagery about each of the several lines. The subsegments may be generated by gating the detector ON only during the period the scan is in the desired areas or by electronically separating the data prior to the correlation process. As discussed with reference to FIG. 1A because of the difference between the scan rate and the motion of the servo driven carriage, the concept is applicable to scanning many more than the five lines illustrated.

The method illustrated in FIG. 1B is directly applicable to the epipolar scan technique disclosed in the Helava patent discussed in the preceding section. In parallel line scanning the lines being scanned are generally normal to the epipolar lines, and the direction of scan normal to the epipolar lines. An operating system, scanning along epipolar lines, is capable of generating parallax data along more than 50 parallel lines during each line scan.

Figure 2:
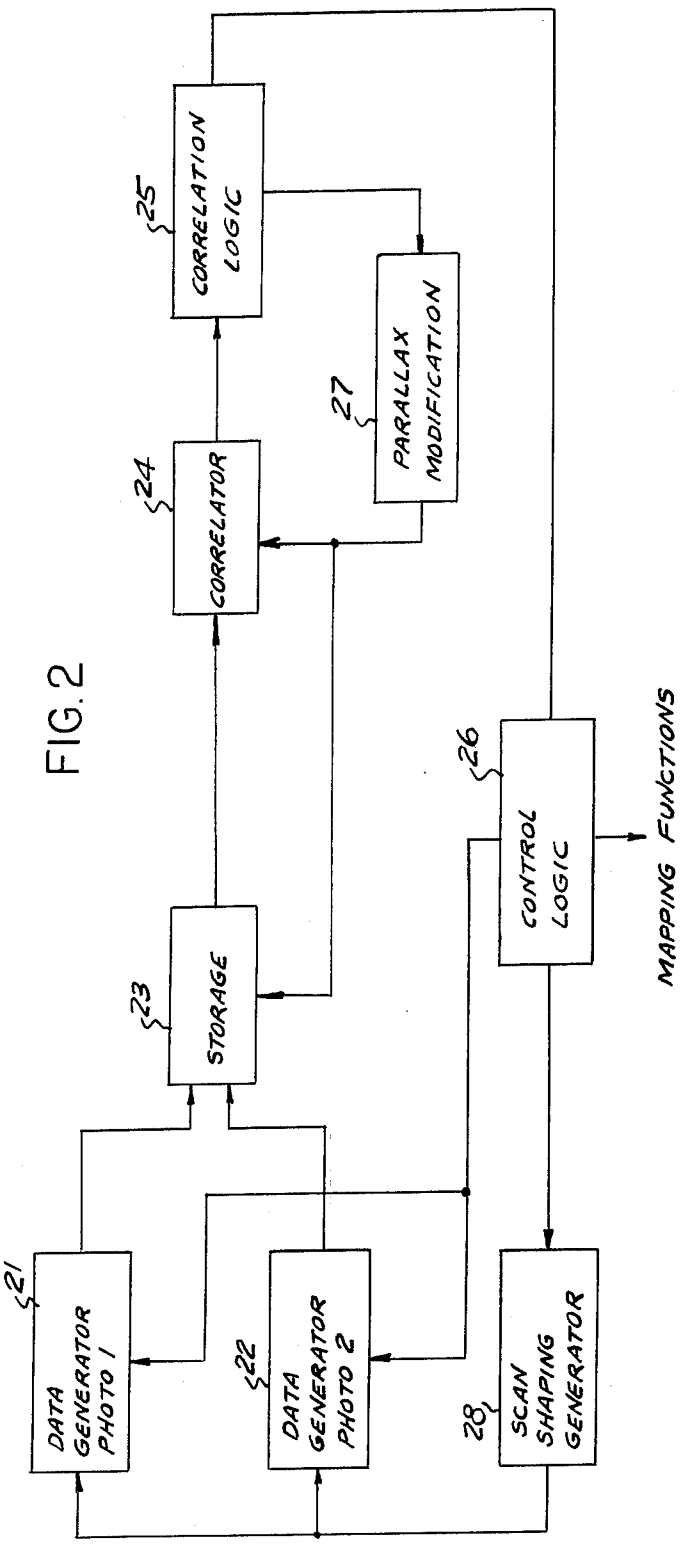
FIG. 2 is a block diagram illustrating the basic concepts of the system for generating parallax data from scanning a plurality of parallel lines.

Manipulation of the data after it has been generated by parallel line scanning is discussed in general with reference to the block diagram illustrated in FIG. 2. Analog information generated by two data generators 21 and 22 from a pair of stereophotographs (not shown) is converted to digital data and stored in storage 23 in the form of data blocks indicative of each area or line scanned. Each data generator comprises a light source illuminating corresponding points on each of the stereo images. The illuminated points are caused to independently scan corresponding areas or lines on the two images by any of the methods known in the art as previously described. It is understood that a single light source may be used and the two illuminating points generated by optical means, using beam splitters, mirrors, prisms, etc. Alternatively, the data generators may incorporate two independent light sources each illuminating a corresponding point on both images. The scanning of the corresponding areas may be done by any appropriate means including electronic deflection where the light sources are cathode ray tubes, or mechanical, electromechanical, acoustical or electro-optical deflection when stationary light sources, such as lasers, are used. Each data generator has a sensor generating electrical signals indicative of the intensity of the illuminated points, after the light has been modulated by the information content of the stereo images. The data generators also include means for shaping the data to correct the geometrical distortions of the images, such as terrain elevation, scaling, photograph geometry, atmospheric abberations, and scanning distortions and means for converting the analog information to digital data. The means of scan shaping may be incorporated in the deflection mechanisms discussed above or may be independent elements providing the required functions.

All the elements discussed with regard to the data generators 21 and 22 are common to most stereomappers in one form or another and the different ways this data may be generated are well known in the art.

The digital data generated by the data generators 21 and 22, respectively, are temporarily stored in the storage 23 as discrete data blocks indicative of the scan pattern. The stored data blocks may be indicative of a scanned area when the scanning is performed block by block as illustrated in FIG. 1A or alternatively the stored data blocks may be indicative of a single line scan when the scanning is performed as illustrated in FIG. 1B. As is known in the art, the storage may include a storage interface to perform various operations such as placing the data blocks generated by the data generators into the storage in sequential order and/or function as a buffer when the data blocks are generated at rates faster than the data can be stored.

Segments of corresponding stored data blocks, at least one segment from the data block generated by data generator 21 and at least one segment from the data block generated by data generator 22 are transferred to a high speed correlator 24 where the correlation function is performed. The correlator 24 correlates the corresponding data segments received from the storage 23 and generates signals indicative of how well the data in the two segments match. The correlator 24 also shifts the data from one segment with respect to the data from the other segment and computes the correlation between the two segments in the various shifted relationships. The data shifting and correlation computation are performed using techniques well known in the art of stereomapping. The correlation data from the various shifted relationships is then analyzed by the correlation logic 25 which determines the parallax between the two data segments when a maximum correlation between the two segments is obtained. Upon determination of maximum correlation and the parallax between the two corresponding data segments, a parallax signal is sent to the parallax modification circuit 27 which initiates transfer of the next corresponding data segments to the correlator 24. The new data segments displace the preceding segments in the correlator 24 and the old data previously correlated is discarded. The parallax data is also communicated to the control logic 26 where it is stored and later used to compute the mapping functions.

The parallax address modification circuit 27 contains a storage in the form of a parallax address function table which stores the parallax data for each parallel line being scanned, and generates address signals for the next segment to be correlated indicative of the relationship between the data segments where maximum correlation between the two corresponding blocks was found during the preceding correlation operation. Each time new parallax data is generated, the new parallax data updates the function table thereby keeping the function table current with the data.

Signals from the parallax modification circuit 27 select the new blocks of data from the storage 23 and transfer them to the correlator 24. Parallax modification circuit 27 also inputs appropriate signals into the correlator 24 which are used to select the appropriate data segments to be correlated from the data blocks. At least one of the selected segments has its data shifted by the signals from the parallax modification circuit, to the shifted relationship where maximum correlation about the same parallel line was previously found. This reduces the shifting required to obtain maximum correlation.

Where the data is generated by a line scan crossing the several parallel lines, the parallax address modification may also divide the data segments into subsegments where each subsegment contains the data for a determinable number of data points along the scan line preceding and following each parallel line. The address for at least one subsegment is modified in accordance with the parallax table so that the shifting of the data to determine maximum correlation is minimized. The parallax address modification 27 in this manner speeds the correlation process by significantly reducing the shifting of the data that must be performed to establish conjugate imagery about each subsequent parallel line.

The parallax data stored in the control logic 26 is used to compute elevation, the data generator steering signals, and the data necessary to perform the desired mapping functions. The control logic 26 is also used to compute from operator inserted data, corrective signals indicative of the geometric distortions that may be present in the photographic images as in the prior art. The corrective signals are transmitted to the scan shaping generator 28, which in turn generates signals operative to control the generation of data from the data generators 21 and 22 corrected for geometrical distortions present in the stereo images.

Figure 3:
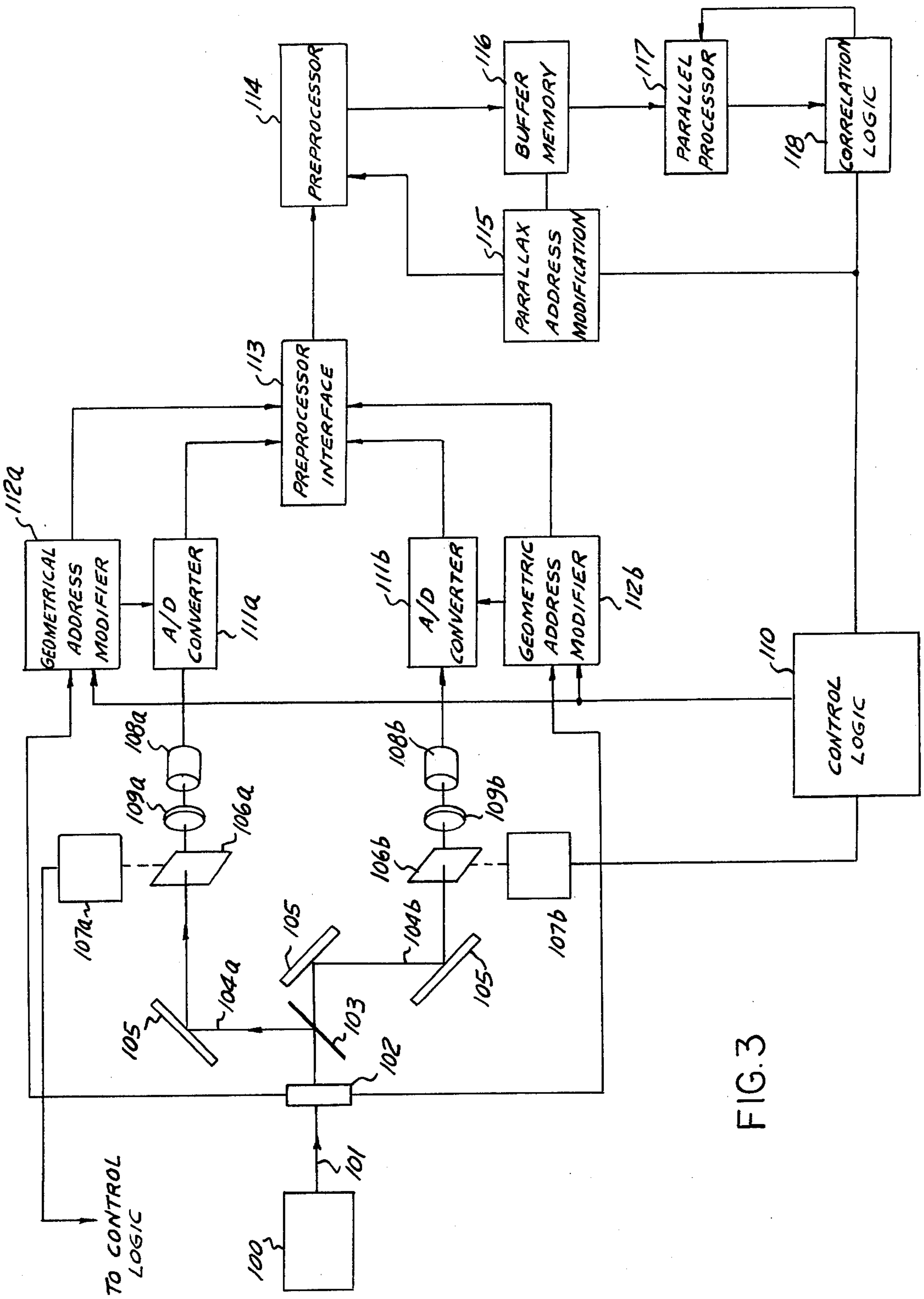
FIG. 3 is a block diagram of a preferred embodiment of the parallel line scanning system.

FIG. 3 is a block diagram illustrating the details of a preferred embodiment of the invention. The data is generated by line scanning across several parallel lines as discussed with reference to FIG. 1B. Further to simplify data reduction, the line scans are directed along epipolar lines as discussed in the Helava patent cited above.

A light source, illustrated as a laser 100 generates a narrow beam of light 101 which passes through an optical deflecting element 102 where the light beam 101 is dynamically deflected to produce a line scan in a direction generally normal to the mechanical movement of the images. The light beam 101 is divided by an optical device, such as beam splitter 103, producing two independent light beams **104*a* and 104*b*. By means of mirrors 105 or other optical elements the light beams 104*a* and 104*b* are directed to stereoscopically generated photographic images 106*a* and 106*b* and caused to scan corresponding epipolar lines on the images 106*a* and 106*b*. The scanning of sequential epipolar lines is accomplished by servos 107*a* and 107*b* which mechanically move the images 106*a* and 106*b* normal to the epipolar lines. It is understood by those skilled in the art that two independent light sources could be used or the beam splitter 103 could procced the optical deflecting element 102, and separate optical deflection elements could be used to deflect each of the separated beams 104*a* and 104*b*. The optical deflection element 102** also includes an encoder which generates a signal for each incremental deflection of the light beam providing a position address indicative of the location of the beams on the images.

The photographic images **106*a* and 106*b* are caused to mechanically move generally in a direction generally normal to the epipolar lines by servos 107*a* and 107*b*, respectively, in response to signals from the control logic 110. The combination of line scanning by the light beams with the mechanical motion of the images causes the light beams to scan corresponding areas on each images as done in prior art systems. It is to be noted that the control logic signals driving the servos 107***a* and 107*b* may include signals to correct the movement of the images by the servos 107*a* and 107*b* for geometrical and parallax distortions so that the light beams always scan corresponding areas on the images. The light beams 104*a* and 104*b* are modulated by the information content of the images 106*a* and 106*b* and are focused on the detector 108*a* and 108*b* by means of optics 109*a* and 109*b*, respectively. The detectors 108*a* and 108*b* convert the light beam 104 *a* and 104*b* modulated by images 106*a* and 106*b* respectively into analog electrical signals indicative of the impinging modulated light. The analog signals are input into analog to digital (A/D) converters 111*a* and 111*b* where the analog signal is sampled and converted into digital data in response to sample signals generated by the geometrical address modification circuits 112*a* and 112*b*, respectively. Each geometrical address modification circuit 112*a* and 112*b* incorporates a function table containing information relating to the geometrical distortions present in the respective image along the epipolar line being scanned. The data stored in the function table is computed by the control logic 110 based on the location of the scan line on the image and the geometrical distortions known to be present in each image. One skilled in the art will recognize that as the scanning proceeds along the parallel lines on each image, due to the mechanical motion of the images induced by servos 107*a* and 107*b*, the function table is updated with new data from the control logic 110 to compensate for changes in geometrical distortions present in the different areas of the images and the parallax data as the scanning proceeds.

The geometrical address modification circuits 112*a* and 112*b* respond to signals generated by the encoder associated with the deflection mechanism 102, a signal indicative of the starting address from the control logic 110 indicative of when the sampling of data should start and the information content of the function table and computes the points along the scan line where samples of the analog signals from the associated detector should be taken to correct for geometrical distortions and supplies the corrected address to each sample. The signals indicative of the points where the samples are to be taken are applied to the associated A/D converter 111*a* and 111*b* which samples and converts to digital data the analog signal only at the points so sampled to correct for the geometrical distortions.

The digitized samples from each image are then stored separately in a preprocessor interface 113 until a complete scan has transpired. The stored samples form a set of corresponding blocks of data, one block indicative of the data relating to one of the images and the other block of data indicative of the data relating to the other image. The two corresponding blocks of data are then transferred to the preprocessor (PP) 114 where they are stored separately. The preprocessor storage may be a single storage into which the complementary data blocks are inserted sequentially or may be two discrete storages, one for the data blocks from each image. When bidirectional scanning is used, as discussed relative to FIG. 1B, the PP interface 113 may also invert the order in which the data generated during the alternate scans are transferred to the preprocessor 114, so that all the data stored in the preprocessor 114 is in the same order. The preprocessor 114 has provisions for storing several sets of corresponding blocks of data for subsequent correlation measurements. The preprocessor may be a high speed storage or in the alternative may be a minicomputer such as the Microdata Corporation, Micro 1600 Computer capable of performing additional functions such as filtering for edge enhancement or summing for averaging the data.

Determinable segments of the data blocks stored in the preprocessor 114 are serially extracted by signals from a parallax address modification circuit 115 and transferred to a buffer memory 116 where they are stored for subsequent manipulation and correlation measurements by a parallel processor 117. In the simplest embodiment of the parallax address modification circuit 115 extracts one segment from block of data, A', for a given scan line on image 106*a* and a corresponding segmennt from block of data, B', from the image 106*b* from the preprocessor 114. However to provide Y parallax data, i.e., parallax data in a direction parallel to the several parallel lines being scanned, comparable segments of data blocks B and B'' indicative of the immediately adjacent scan lines on both sides of the corresponding scan line may also be transferred from the preprocessor 114 to the buffer memory 116. Upon instructions from an address modification circuit 115, a subsegment of the data segment A' about the first line covered by the parallel line scan is transferred to the parallel processor 117 along with a first subsegment from data segments B, B', and B''. The subsegments of data segments B, B', and B'' are slightly larger than the subsegment of data segment A' to permit shifting of the data to determine maximum correlation and conjugate imagery as is done in the prior stereomapper art. The parallel processor 117 then correlates the subsegment of data segment A' with the corresponding subsegments of data segments B, B' and B'' and communicates the correlation data to the correlation logic 118 where the correlation data is evaluated and parallax computed. The correlation logic 118 may be a special purpose computer or alternatively a commercially available minicomputer such as Microdata Corporation, Micro 1600 Computer, programmed to perform the desired functions. The parallax data is then transferred to the control logic 110 and the parallax address modification circuit 115.

The correlation logic 118 then transfers by means of the parallax address modification circuit 115 a second subsegment of data segment A' and corresponding subsegments of data segments B, B' and B'' indicative of the image data about the next sequential parallel line to the parallel processor where the operation is repeated and the parallax for the second segment determined. This process is repeated until parallax data for all the parallel lines being scanned has been determined.

After the data with reference to data block A' has been correlated, the segment A' and the segment B stored in the buffer memory 116 are discarded and the buffer memory is updated with segments from data blocks A'' and B''' indicative of the next adjacent scans on the two images, respectively. The correlation process is again repeated as before with the new data.

The parallax address modification circuit 115 provides a data shaping function similar to the function the geometrical address modification circuit 112 correcting for parallax between the subsegments being correlated. The parallax address modification contains an active function table containing parallax data for each subsegment of the B data determined from the prior parallax computation by the correlation logic 118. Upon command from the correlation logic 118 to transfer the next A and B subsegments from the buffer memory 116 to the parallel processor 117, the parallax address modification circuit 115 modifies the address of the B segment being transferred in accordance with the parallax data for the particular subsegment determined in analyzing the preceding data segment for the preceding subsegment. The parallax address modification significantly reduces the amount of data shifting necessary to determine conjugate points of imagery and increases the speed of the correlation process. In this manner, the parallax data may be generated for successive points along many lines without exceeding the computation capacity of existing electronics.

The parallax data transferred to the control logic 110 along with its address for subsequent manipulation to generate the desired map. The control logic, as with prior art systems, performs the necessary off-line processing of the parallax data input to the storage from the inventive on-line system. The control logic 110 is also used to compute the steering signals for the mechanical drives moving the photographic images **106*a* and 106*b*** to maintain the corresponding areas of the image within the scan area due to geometrical distortions and variation in elevation and slope.

Electronic circuits to perform the functions discussed with reference to the various elements of the block diagram of FIG. 3 are well known to those skilled in the art. Circuits for scan shaping, such as the geometric address modification and parallax address modification circuits 112 and 115, respectively, and electronic circuits for performing various types of correlation measurements have been disclosed in the cited prior art and need not be shown in detail.

Figure 4:
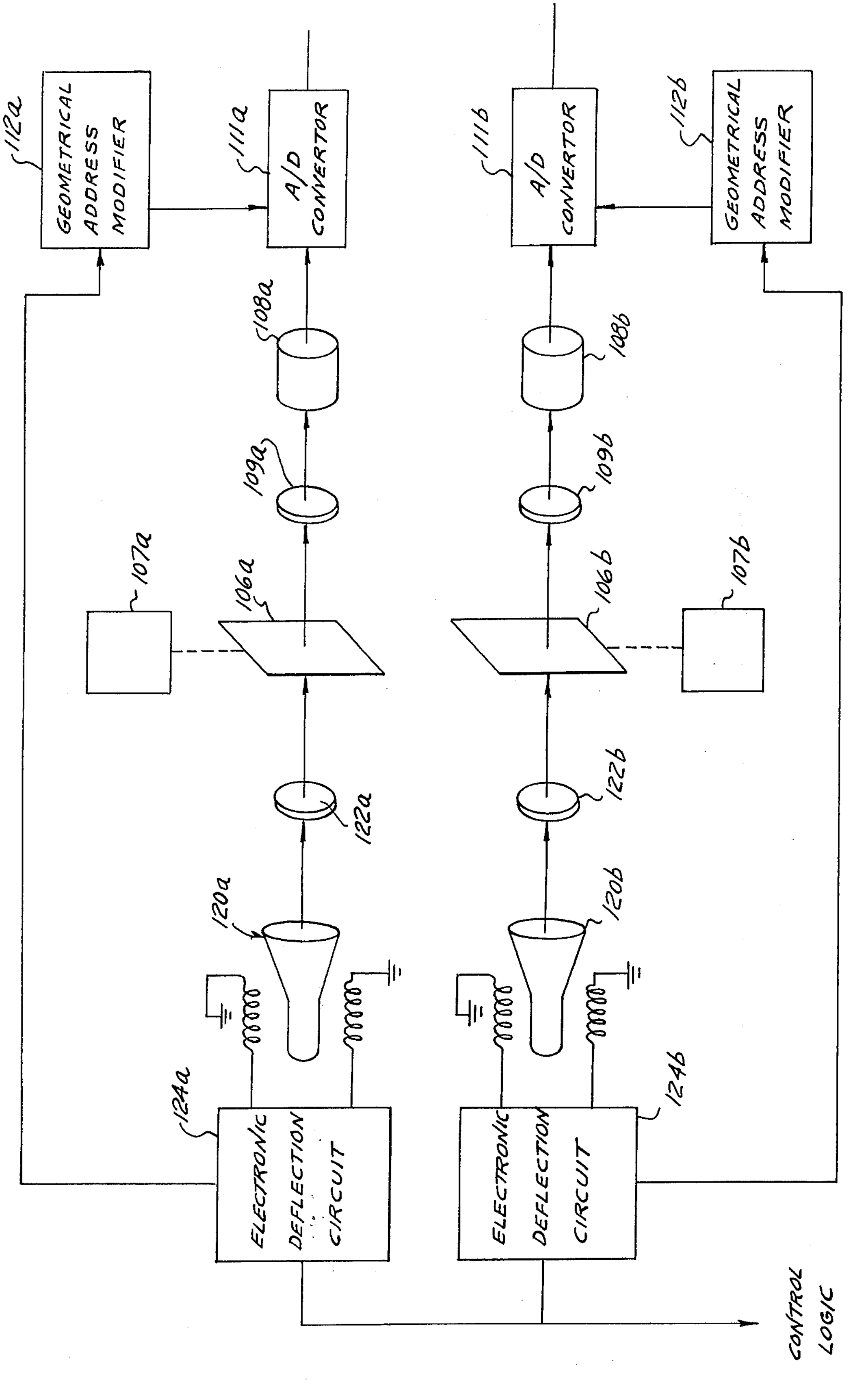
FIG. 4 is an alternate embodiment of the data generators using cathode ray tubes.

FIG. 4 shows an alternate method for generating digital image data which is equally applicable to the inventive system. In place of the laser, as shown in FIG. 3, the alternate embodiment has two cathode ray tubes **120*a* and 120*b*, each generating a light spot on their respective faces. The two light spots are respectively focused on the stereoscopically generated images 106*a* and 106*b* by lenses 122*a* and 122*b* as shown. As in the preferred embodiment, the light spots are modulated by the image information on the respective stereoscopic images and by means of lenses 109*a* and 109*b* respectively; the modulated light is focused on the detectors 108*a* and 108*b*. The detectors in turn generate analog image data which is subsequently converted to digital data by A/D converter 111*a* and 111*b* as previously described with respect to FIG. 3. The scanning of the light spots across the images is accomplished by electronically deflecting the position of the light spots on the face of the cathode ray tubes by electronic deflection circuits 124*a* and 124*b* respectively. Such electronic deflection circuits are prevalent in the prior art and do not have to be discussed in detail. Signals indicative of the position of the light spots on the faces of the respective cathode ray tubes may readily be derived from electronic deflection circuits and are input to the geometrical address modifier circuits 112*a* and 112*b* permitting the appropriate address to be applied to the digital data as previously described with reference to FIG. 3. The remainder of the system is identical to that shown in FIG. 3.**

The operation of the parallel line scanning stereomapper system is discussed with reference to the flow chart FIG. 5. Analog image data is generated as indicated in blocks **200*a* and 200*b*, from two stereoscopic images, A and B respectively, by line scanning along epipolar lines the two images with light beams as discussed with reference to blocks 21 and 22 on FIG. 2. Digital address signals are generated as indicated in block 202 from signals generated by the scan mechanism associated with the analog signal generators. The digital address signals are input into the address modification circuit where the address signals are modified, as indicated in blocks 204*a* and 204*b*, by geometrical distortion signals to correct for known geometrical distortions in the images. These geometrical distortion signals are generated in block 206 from data input into the control logic of the stereomapper. The modified digital address signals are then used to sample the analog signals as indicated in blocks 208*a* and 208*b*, to convert the analog data generated from the respective stereoscopic images into digital data. The modification of the address signals prior to sampling assures that the samples are taken at corresponding points on both images. The digital data is then serially accumulated and formed into blocks of digital data, blocks 210*a* and 210*b*, indicative of the data generated by one line scan of each image. The formed data blocks are then temporarily stored, block 212,** prior to correlation.

The correlation of data from corresponding areas on the two stereoscopic images is performed in the following manner. At least two data blocks indicative of corresponding areas on the two stereoscopic images are extracted from the temporary storage by a data block select signal on line 224 generated by the parallax address modification circuit, as previously discussed with reference to block 115 in FIG. 3, and stored in a buffer memory, block 214, during the correlation process. Corresponding segments from both data blocks stored in the buffer memory are then extracted and transmitted along line 228 to the parallel processor, block 117, of FIG. 3 where the corresponding data segments are correlated as indicated by block 216, to generate correlation data as previously discussed. The correlation data is then evaluated and parallax computed in block 218.

The address for the data segments to be correlated are sequentially generated in block 222. The sequentially generated segment addresses are indicative of data segments having digital data a predetermined distance on both sides of each parallel line being scanned. Due to parallax, however, the corresponding imagery on the two images is physically displaced, therefore, there is a comparable displacement of the data in the data blocks which would require extensive shifting of the data in the corresponding segments to find the shifted relationship necessary to produce maximum correlation, when the segments are selected in accordance with the initially generated segment addresses. To eliminate this problem, the initially generated segment addresses are modified by the parallax data in block 220 to correct the generated segment addresses for the parallax found during the correlation of the preceding data blocks. The parallax address modification circuit shifts the segment address for one of the data blocks so that the selected segment has the same shifted relationship where maximum correlation was found during the correlation of the corresponding segment in the preceding data block. This modification of the segment address reduces not only the amount of shifting necessary to find the shifted relationship between the two segments to establish maximum correlation, but also reduces the size of the segment required to establish correlation and increases the speed at which the correlation process can be performed. The modified segment address signals are output as segment select signals communicated to the buffer storage along line 226 and select in sequential order the subsequent corresponding data segments to be correlated.

The parallax signals are also transmitted to the control logic which generates the required mapping signals. The mapping signals are generated in the control logic block 230 using any of the methods known in the art, including those in the previously cited references. The control logic also generates steering signals, as indicated by block 232, to control the generation of the analog image data from corresponding areas on both stereoscopic images. This steering function is commonly employed in existing automatic stereomapper systems, and does not need to be discussed in detail for an understanding of the present invention.

The salient feature of the disclosed system is its capability to generate parallax data about a plurality of parallel lines during a single mechanical translation. This capability is provided by the conversion of the analog image data to digital data, on-line correction of the digital data for geometrical distortions in the stereoscopic images, capability to temporarily store the digital data, to permit the generation of image data and the correlation to proceed independently, and the shifting of the data prior to correlation, to the shifted relationship where maximum correlation was found during the correlation of the preceding data segment, having image data about the same parallel line. By this method both geometrical and parallax distortions are removed prior to correlation permitting the correlation to be performed on-line at a high rate of speed comparable to the speed at which the image data is generated.

Figure 5:
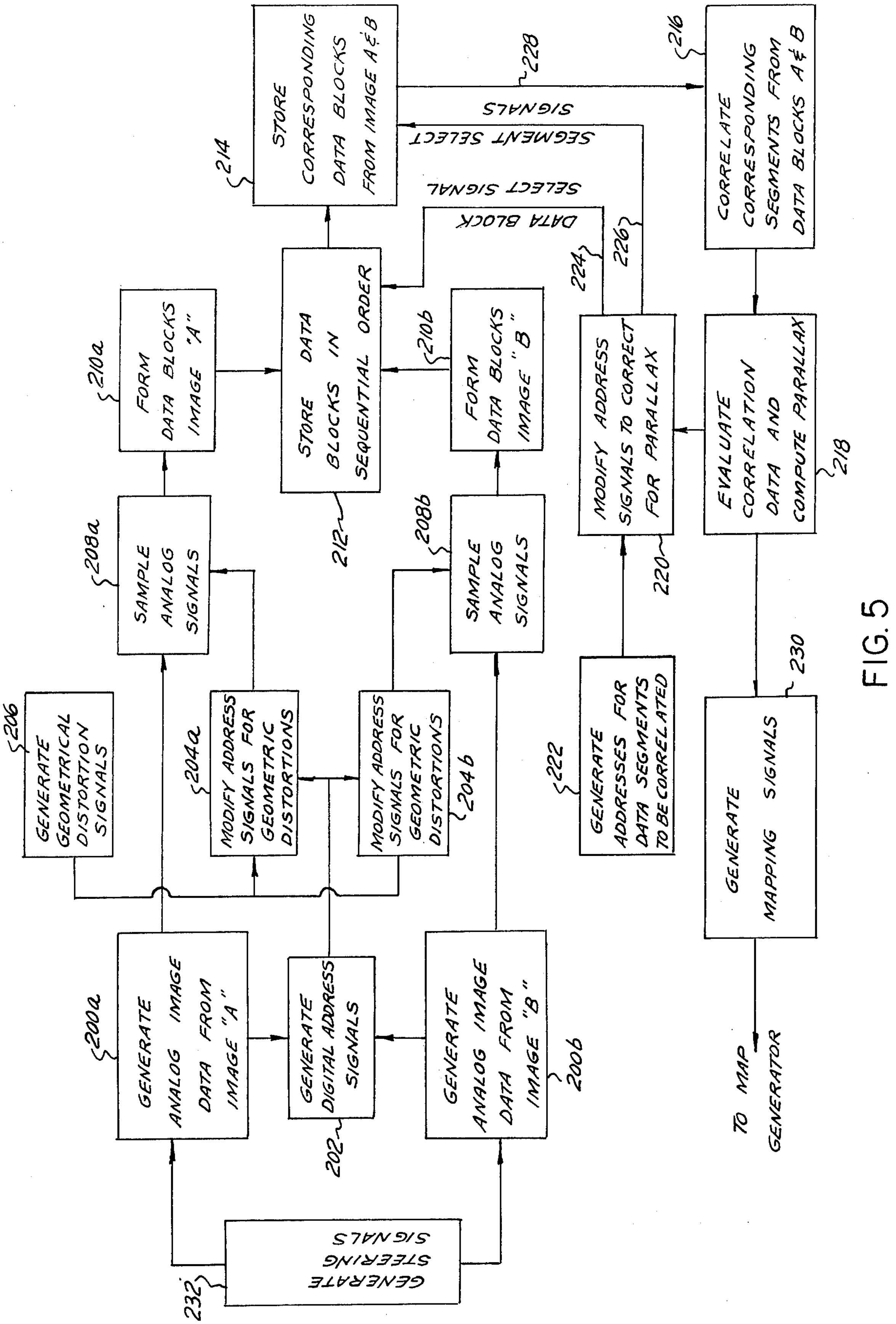
FIG. 5 is a flow chart used in describing the operation of the system.

It should be appreciated that the data control functions described with respect to FIG. 5 can be performed with both hardwired logic and software logic. However, because the stored data is constantly changing, an erasable memory computer is an important element of the total system. But nevertheless, the inventive control and data processing functions can be performed using hardware, software, or firmware logic.

While the preferred embodiment of the inventive parallel line scanning is illustrated using a line scan which crosses several lines, one skilled in the art will recognize that an equivalent system may be conceived using area scanning about each of the several lines as illustrated in FIG. 1A. In this latter type of system the scan shaping correcting for geometrical distortions may be applied to the scan deflection mechanism rather than the data from the detectors and the discrete data blocks subsequently manipulated by the electronics would be an area rather than a line. It is recognized that these types of changes as discussed above, as well as changes to the way in which the data is handled prior to correlation, may be made to the invention as set forth in the appended claims and the objective of the invention still be achieved. Accordingly, it is intended that the illustrative and descriptive materials herein be used to illustrate the principles of the invention and not to limit the scope thereof.

What is claimed is:

1. In an automatic stereomapper for making a map from a pair of stereoscopic images, said stereomapper having means for mechanically translating said stereoscopic images relative to said stereomapper along a series of parallel lines at predetermined intervals within the area of the stereoscopic images to be mapped, means scanning corresponding areas on both stereoscopic images for generating parallax data indicative of the displacement of corresponding imagery on the stereoscopic images, a control computer for converting the parallax data into information from which the map can be made and means for receiving the information for making the map, an improvement to the means for making parallax data for generating parallax data about a plurality of parallel lines, disposed parallel to said mechanical translation during each of the translations comprising:

means for generating, during each mechanical translation of said stereoscopic images, blocks of digital data indicative of corresponding imagery on both stereoscopic images about a plurality of parallel lines disposed parallel to the direction of the translation;

means for temporarily storing said blocks of digital data in a predetermined sequence;

means receiving at least two blocks of digital data from said storage means, one block of data indicative of the imagery on one stereoscopic image and the other block of data indicative of the corresponding imagery on the other stereoscopic image for correlating the data in said at least two blocks of digital data in a plurality of shifted relationships to generate correlation data indicative of the correlation at each shifted relationship;

means receiving said correlation data for generating parallax data indicative of the shifted relationship between the data in said at least two blocks of digital data when said correlation data is indicative of maximum correlation; and means receiving said parallax data for generating a data transfer signal transferring the next two data blocks to be correlated from the storage means to the correlation means and a parallax address modification signal to shift the data in one of the two blocks of digital data transferred to the correlation means to the shifted relationship having maximum correlation during the correlation of the two blocks of data just previously correlated.

2. The improvement of claim 1 wherein said means for generating blocks of digital data comprises:

means having a repetitious scan pattern for individually scanning corresponding areas on both stereoscopic images about said plurality of parallel lines with a point of light to generate light signals modulated by the imagery in each of the scanned corresponding areas;

detector means for converting said modulated light signals into analog electrical signals;

means associated with said means for scanning for generating digital address signals at predetermined intervals indicative of the position of said point of light during the scanning of said corresponding areas;

means responsive to said digital address signals for sampling said analog electrical signals to generate digital data indicative of the imagery on both stereoscopic images at said predetermined intervals; and means temporarily storing the digital data generated during each scan of both stereoscopic images for forming individual blocks of image data indicative of the imagery on the individual stereoscopic images within each repetitive scan pattern.

3. The improvement of claim 2 wherein the control computer generates distortion signals indicative of known geometrical distortions in the stereoscopic images, said means for sampling further includes means responsive to said distortion signals for controlling the predetermined intervals at which said samples are taken to correct for the known geometrical distortions in the stereoscopic images.

4. The improvement of claim 3 wherein said means for scanning comprises:

two cathode ray tubes, each having an electron beam generating a point of light on the face of each tube;

means for individually focusing both of said points of light on the stereoscopic images, one point of light being focused on one stereoscopic image, and the other point of light being focused on a corresponding point on the other stereoscopic image; and means for deflecting said electron beams to cause said points of light to scan corresponding areas respectively on each of said stereoscopic images.

5. The improvement of claim 3 wherein said means for scanning comprises:

a light source for generating a narrow beam of light;

means for dividing said narrow beam of light into two separate beams of light, one of said two light beams caused to be incident at a point on one of said stereoscopic images and the other of said two light beams caused to be incident on a corresponding point on the other of said stereoscopic images; and means for deflecting said two light beams to scan corresponding areas on both stereoscopic images.

6. The improvement of claim 5 wherein said light source is a laser.

7. The improvement of claim 2 wherein said means for scanning scans a predetermined area about predetermined points on each of said plurality of parallel lines in a predetermined order and wherein said means for forming blocks of digital data forms blocks of data indicative of each predetermined area generated by scanning about each predetermined point.

8. The improvement of claim 2 wherein said means for scanning, line scans along a line transverse to the direction of the translation said line scan crossing each of the plurality of parallel lines and wherein said means for forming blocks of digital data forms blocks of digital data indicative of the data generated along each line scan respectively.

9. The improvement of claim 8 wherein said means for correlating further includes:

buffer storage means for temporarily storing said received blocks of digital data;

means for sequentially extracting from said buffer storage corresponding segments of data, one corresponding data segment from each stored data block indicative of the digital data a predetermined distance both sides of one of said plurality of parallel lines; and parallel processor means for correlating said data segments to generate correlation data about each of said plurality of parallel lines.

10. The improvement of claim 9 wherein said buffer storage means temporarily stores one block of digital data generated by the line scan on one stereoscopic image and three blocks of data generated by three successive line scans on the other stereoscopic image, wherein one of said three blocks of data is said other block of data indicative of corresponding imagery;

said means for sequentially extracting further extracts from the other two blocks of data, data segments indicative of the digital data a predetermined distance both sides of the same one of said plurality of parallel lines; and said parallel processor means correlates said one data segment with each of said three segments to generate said correlation data;

and wherein said means for generating parallax data generates parallax data indicative of both the shifted relationship between the data correlated and the data block from which the segment having maximum correlation was extracted, thereby providing parallax data both transverse and parallel to each of said plurality of parallel lines.

11. The improvement of claim 8 wherein said means for scanning, line scans along epipolar lines on both stereoscopic images.

12. A system for generating parallax data from a pair of stereoscopic images about a plurality of parallel lines comprising:

means for generating, from said stereoscopic images, blocks of digital data indicative of corresponding imagery on both of said stereoscopic images about a plurality of parallel lines disposed parallel to the direction of a mechanical translation;

means for mechanically translating both of said stereoscopic images relative to said means for generating blocks of digital data along corresponding lines on each stereoscopic image parallel to said plurality of parallel lines;

means for temporarily storing said blocks of digital data in a predetermined sequence;

means receiving at least two blocks of digital data from said storage means, one block of data indicative of the imagery on one stereoscopic image and the other block of data indicative of the corresponding imagery on the other stereoscopic image for correlating the data in said at least two blocks of digital data in a plurality of shifted relationships to generate correlation data indicative of the correlation at each shifted relationship;

means receiving said correlation data for generating parallax data indicative of the shifted relationship between the data in said at least two blocks of digital data when said correlation data is indicative of a maximum correlation; and means receiving said parallax data for generating a data transfer signal transferring the next two data blocks to be correlated from the storage means to the correlation means and a parallax address modification signal to shift the data in one of the two blocks of digital data transferred to the correlation means to the shifted relationship having maximum correlation during the correlation of the two blocks of data just previously correlated.

13. The system of claim 12 wherein said means for generating blocks of digital data comprises:

means having a repetitious scan pattern for individually scanning corresponding areas on both stereoscopic images about said plurality of parallel lines with a point of light to generate light signals modulated by the imagery in each of the scanned corresponding areas;

detector means for converting said modulated light signals into analog electrical signals;

means associated with said means for scanning for generating digital address signals at predetermined intervals indicative of the position of said point of light during the scanning of said corresponding areas;

means responsive to said digital address signals for sampling said analog electrical signals to generate digital data indicative of the imagery on both stereoscopic images at said predetermined intervals; and means temporarily storing the digital data generated during each scan of both stereoscopic images for forming individual blocks of image data indicative of the imagery on the individual stereoscopic images within each repetitive scan pattern.

14. The system of claim 13 wherein said stereoscopic images have known geometrical distortions, said means for sampling further includes means responsive to distortion signals indicative of said known geometrical distortions for controlling the predetermined intervals at which said samples are taken to correct for the known geometrical distortions in the stereoscopic images.

15. The system of claim 14 wherein said means for scanning comprises:

two cathode ray tubes, each having an electron beam generating a point of light on the face of each tube;

means for individually focusing both of said points of light on the stereoscopic images, one point of light being focused on one stereoscopic image and the other point of light being on a corresponding point on the other stereoscopic image; and means for deflecting said electron beams to cause said points of light to scan corresponding areas respectively on each of said stereoscopic images.

16. The system of claim 14 wherein said means for scanning comprises:

a light source for generating a narrow beam of light;

means for dividing said narrow beam of light into two separate beams of light, one of said two light beams caused to be incident at a point on one of said stereoscopic images and the other of said two light beams caused to be incident on a corresponding point on the other of said stereoscopic images; and means for deflecting said two light beams to scan corresponding areas on both stereoscopic images.

17. The system of claim 16 wherein said light source is a laser.

18. The system of claim 13 wherein said means for scanning scans a predetermined area about predetermined points on each of said plurality of parallel lines in a predetermined order and wherein said means for forming blocks of digital data forms blocks of data indicative of each predetermined area generated by scanning about each predetermined point.

19. The system of claim 13 wherein said means for scanning line scans along a line transverse to the direction of the translation said line scan crossing each of the plurality of parallel lines and wherein said means for forming blocks of digital data forms blocks of digital data indicative of the data generated along each line scan respectively.

20. The system of claim 19 wherein said means for correlating further includes:

buffer storage means for temporarily storing said received blocks of digital data;

means for sequentially extracting from said buffer storage corresponding segments of data, one corresponding data segment from each stored data block indicative of the digital data a predetermined distance either side of one of said plurality of parallel lines; and parallel processor means for correlating said data segments to generate correlation data about each of said plurality of parallel lines.

21. The system of claim 20 wherein said buffer storage means temporarily stores one block of digital data generated by the line scan on one stereoscopic image and three blocks of data generated by three successive line scans on the other stereoscopic image, wherein one of said three blocks of data is said other block of data indicative of corresponding imagery;

said means for sequentially extracting further extracts from the other two blocks of data, data segments indicative of the digital data a predetermined distance both sides of the same one of said plurality of parallel lines; and said parallel processor means correlates said one data segment with each of said three segments to genertate said correlation data;

and wherein said means for generating parallax data generates parallax data indicative of both the shifted relationship between the data correlated and data block from which the segment having maximum correlation was extracted, thereby providing parallax data both transverse and parallel to each of said plurality of parallel lines.

22. The system of claim 19 wherein said means for scanning, line scans along epipolar lines on both stereoscopic images.

23. A method for generating, from a pair of stereoscopic images, parallax data along each line of a plurality of parallel lines during a single mechanical translation of the stereoscopic images comprising:

scanning corresponding areas on the stereoscopic images about a plurality of parallel lines disposed parallel to the direction of the mechanical translation to generate blocks of digital image data indicative of the image detail in the areas scanned on both stereoscopic images;

temporarily storing in a storage means said blocks of digital image data in a predetermined sequence;

correlating in a correlating means the digital image data from at least two blocks of image data, transferred from said storage means, in a plurality of shifted relationships to generate correlation data indicative of the correlation at each shifted relationship, one block of image data extracted from said storage means indicative of the image detail in the scanned area on one stereoscopic image and the other of said at least two blocks of data indicative of the corresponding image detail on the other stereoscopic image;

generating parallax data from said correlation data indicative of the shifted relationship between said at least two blocks of digital data when said correlation data is indicative of maximum correlation; and generating, from said parallax data, data transfer signals to transfer the next two blocks of digital data to be correlated from the storage means to said correlation means and parallax address modification signals to shift the data in one of said at least two blocks of digital data transferred, to the shifted relationship having maximum correlation during the correlation of the two blocks of data just previously correlated.

24. The method of claim 23 wherein said step of scanning comprises:

scanning with a repetitive scan pattern corresponding areas on both sterosscopic images about said plurality of parallel lines with a point of light to generate light signals modulated by the image detail in each of the scanned corresponding areas;

detecting said modulated light signals to generate analog electrical signals;

generating digital address signals at perdetermined intervals indicative of the position of said points of light during the scanning of said corresponding areas;

sampling said analog electrical signals with said digital address signals to generate digital data indicative of the image detail on both stereoscopic images at said predetermined intervals; and accumulating said digital data generated within each repetitive scan pattern to form individual blocks of digital data, each block of digital data being associated with one steroscopic image and one repetitive scan pattern.

25. The method of claim 24 wherein said steroscopic mages have known geometrical distortions, said nethod further includes the steps of:

generating distortion signals indicative of the known geometrical distortions; and modifying said geometrical address signals with said distortion signals to change the predetermined intervals at which said samples are taken to compensate for the known geometrical distortions.

26. the method of claim 25 wherein said step of scanning comprises:

generating, on the face of two cathode ray tubes having electron beams the two points of light, one point of light being on one of said two cathode ray tubes and the other point of light being on the other of said two cathode ray tubes;

individually focusing both of said points of light on the stereoscopic images, one point of light being focused on one sterescopic image and the other point of light on the corresponding point on the other stereoscopic image; and deflecting said electron beams to cause said points of light to scan corresponding areas rescpectively on each of said stereoscopic images.

27. The method of claim 25 wherein said step of scanning comprises:

generating a narrow beam of light;

dividing said narrow beam of light into two separate beams of light, one of said two light beams caused to be incident at a point on one of said stereoscopic images and the other of said two light beams caused to be incident in a corresponding point on the other of said stereoscopic images; and synchronously deflecting said two light beams by optical means to scan corresponding areas on both stereoscopic images.

28. The method of claim 27 wherein said step of generating a narrow beam of light includes generating a narrow beam of light by means of a laser.

29. The method of claim 24 wherein said step of scanning includes:

scanning predetermined areas about predetermined points on each of said plurality of parallel lines in a predetermined order and wherein said step of accumulating said digital data accumulates the data indicative of each predetermined area scanned about each predetermined point.

30. The method of cliam 24 wherein said step of acanning includes line scanning along a line traverse to the direction of the mechanical translation, said line scan crossing each of the plurality of parallel lines and wherein said accumulating step forms blocks of digital data indicative of the data generated along each line scanned respectively.

31. The method of claim 30 wherein said step of correlating further includes:

temporarily storing said blocks of digital data in a buffer storage;

sequentially extracting from said buffer storage corresponding segments of data, one corresponding data segment from each data block indicative of the digital data a predetermined distance both sides of one of said plurality of parallel lines; and correlating said data segments to generate correlation about said one of said parallel lines.

32. The method of claim 31 wherein:

said step of storing in a buffer storage includes storing one block of digital data generated by a line scan on one of said stereoscopic images and storing three blocks of digital data generated by three successive line scans on the other stereoscopic image wherein one of said three blocks of digital data is the other block of digital data of said at least two blocks of digital data indicative of corresponding image detail;

said step of extracting further includes the step of extracting from said three of said three blocks of digital data, data segments indicative of the digital data on a predetermined distance on both sides of the same one of said plurality of parallel lines;

said step of correlating further includes the steps of correlating said one data segment with each of said three data segments in a predetermined sequence to generate correlation data; and wherein said step of generating parallax data further includes the step of generating parallax data indicative of which one of said three blocks of digital data, the segment having maximum correlation was extracted, thereby generating parallax data both transverse and parallel to each of said plurality of parallel lines.

33. The method of claim 30 wherein said step of scanning, line scans along epipolar lines on both of the stereoscopic images.

* * * * *

UNITED STATES PATENT OFFICE
CERTIFICATE OF CORRECTION

PATENT NO. : 3,901,595

DATED : August 26, 1975

INVENTOR(S) : Uuno V. Helava, Arliss E. Whiteside and Gerald A. Brumm

It is certified that error appears in the above-identified patent and that said Letters Patent are hereby corrected as shown below:

Col. 17, line 22, change "perdetermined" to ---predetermined---.

Col. 17, line 36, change "mages" to ---images---.

Col. 17, line 54, after "light" add ---being focused---.

Col. 17, line 57, change "rescpectively" to ---respectively---.

Col. 18, line 17, change "cliam" to ---claim---.

Col. 18, line 18, change "acanning" to ---scanning---.

Col. 18, line 48, delete the word "on", first occurrence.

Signed and Sealed this

*fifteenth* Day of *June 1976*

[SEAL]

*Attest:*

RUTH C. MASON
*Attesting Officer*

C. MARSHALL DANN
*Commissioner of Patents and Trademarks*